US012621531B2

(12) United States Patent
Ding

(10) Patent No.: US 12,621,531 B2
(45) Date of Patent: May 5, 2026

(54) VIDEO PLAY METHOD AND APPARATUS AND ELECTRONIC DEVICE

(71) Applicant: VIVO MOBILE COMMUNICATION CO., LTD., Guangdong (CN)

(72) Inventor: Ruixu Ding, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 34 days.

(21) Appl. No.: 18/756,075

(22) Filed: Jun. 27, 2024

(65) Prior Publication Data

US 2024/0348884 A1 Oct. 17, 2024

Related U.S. Application Data

(63) Continuation of application No. PCT/CN2022/141203, filed on Dec. 23, 2022.

(30) Foreign Application Priority Data

Dec. 28, 2021 (CN) .......................... 202111622873.2

(51) Int. Cl.
*H04N 21/472* (2011.01)
*G06T 7/20* (2017.01)

(52) U.S. Cl.
CPC ......... *H04N 21/47217* (2013.01); *G06T 7/20* (2013.01); *H04N 21/47205* (2013.01); *G06T 2207/30241* (2013.01)

(58) Field of Classification Search
None
See application file for complete search history.

(56) References Cited

U.S. PATENT DOCUMENTS

| | | | | |
|---|---|---|---|---|
| 10,514,837 B1* | 12/2019 | Li | .......................... | G06F 3/0482 |
| 2006/0217858 A1 | 9/2006 | Peng | | |
| 2018/0061065 A1* | 3/2018 | Mayuzumi | ........... | G06V 40/172 |

FOREIGN PATENT DOCUMENTS

| | | |
|---|---|---|
| CN | 105163080 A | 12/2015 |
| CN | 105227830 A | 1/2016 |
| CN | 105677159 A | 6/2016 |
| CN | 105763911 A | 7/2016 |
| CN | 105827959 A | 8/2016 |
| CN | 110072150 A | 7/2019 |
| CN | 110753199 A | 2/2020 |
| CN | 112434186 A | 3/2021 |
| CN | 114286160 A | 4/2022 |

* cited by examiner

*Primary Examiner* — James R Marandi
(74) *Attorney, Agent, or Firm* — Price Heneveld LLP

(57) ABSTRACT

This application discloses a video play method and apparatus and an electronic device, and pertains to the field of video play technologies. The video play method includes: displaying a motion trajectory on a play interface of a target video when the target video is played, where the motion trajectory is a motion trajectory of a camera when photographing the target video, and points on the motion trajectory correspond to image frames in the target video; receiving a first input of a user for a target point on the motion trajectory; and in response to the first input, controlling the target video to start playing from an image frame corresponding to the target point.

11 Claims, 4 Drawing Sheets

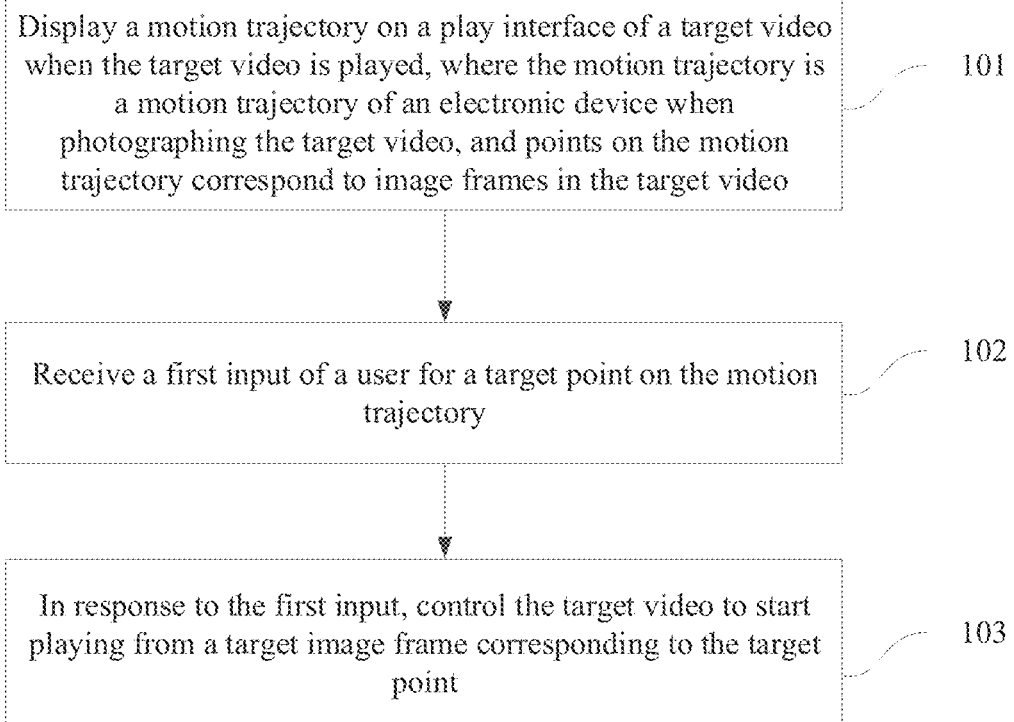

Display a motion trajectory on a play interface of a target video when the target video is played, where the motion trajectory is a motion trajectory of an electronic device when photographing the target video, and points on the motion trajectory correspond to image frames in the target video — 101

Receive a first input of a user for a target point on the motion trajectory — 102

In response to the first input, control the target video to start playing from a target image frame corresponding to the target point — 103

FIG. 1

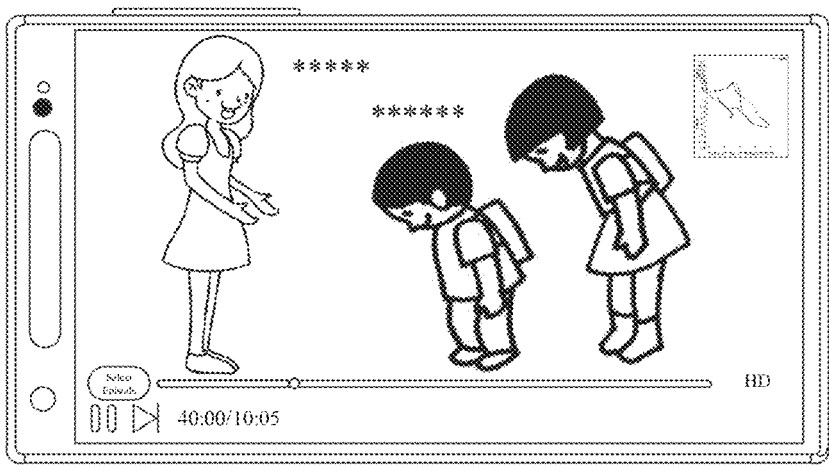

VIDEO PLAY METHOD AND APPARATUS AND ELECTRONIC DEVICE

CROSS-REFERENCE TO RELATED APPLICATIONS

The present application is a continuation application of International Application No. PCT/CN2022/141203 filed on Dec. 23, 2022, which claims priority of Chinese Patent Application No. 202111622873.2, filed with the China National Intellectual Property Administration on Dec. 28, 2021, and entitled "VIDEO PLAY METHOD AND APPARATUS AND ELECTRONIC DEVICE", both of which are incorporated herein by reference in their entireties.

TECHNICAL FIELD

This application pertains to the field of video play technologies, and specifically relates to a video play method and apparatus and an electronic device.

BACKGROUND

A time progress bar may be used in conventional video play, and a desired play location is selected by using the time progress bar. However, in a process of implementing this application, the inventor finds that the prior art has at least the following problem: a manner of selecting a play location only by using the time progress bar is single, and if a time cue is useless, it is difficult for a user to locate video content that the user is interested in.

SUMMARY

Embodiments of this application are intended to provide a video play method and apparatus and an electronic device, and can resolve a problem in the prior art that a play location is only selected by using a time progress bar during video play, and some video content that is not related to a time cue cannot be located.

According to a first aspect, an embodiment of this application provides a video play method. The method includes:

displaying a motion trajectory on a play interface of a target video when the target video is played, where the motion trajectory is a motion trajectory of a camera when photographing the target video, and points on the motion trajectory correspond to image frames in the target video;

receiving a first input of a user for a target point on the motion trajectory; and in response to the first input, controlling the target video to start playing from an image frame corresponding to the target point.

According to a second aspect, an embodiment of this application provides a video play apparatus. The apparatus includes:

a display module, configured to display a motion trajectory on a play interface of a target video when the target video is played, where the motion trajectory is a motion trajectory of an electronic device when photographing the target video, and points on the motion trajectory correspond to image frames in the target video;

a first receiving module, configured to receive a first input of a user for a target point on the motion trajectory; and a first play module, configured to: in response to the first input, control the target video to start playing from a target image frame corresponding to the target point.

According to a third aspect, an embodiment of this application provides an electronic device. The electronic device includes a processor, a memory, and a program or an instruction that is stored in the memory and that can be run on the processor, where when the program or the instruction is executed by the processor, steps of the method according to the first aspect are implemented.

According to a fourth aspect, an embodiment of this application provides a readable storage medium. The readable storage medium stores a program or an instruction. When the program or the instruction is executed by a processor, steps of the method according to the first aspect are implemented.

According to a fifth aspect, an embodiment of this application provides a chip. The chip includes a processor and a communication interface. The communication interface is coupled to the processor. The processor is configured to run a program or an instruction to implement steps of the method according to the first aspect.

According to a sixth aspect, an embodiment of this application provides a computer program product. The computer program product is stored in a non-transient storage medium. The computer program product is executed by at least one processor to implement steps of the method according to the first aspect.

In embodiments of this application, a motion trajectory of photographing a target video is synchronously displayed when the target video is played, and there is a correspondence between video frames of the target video and points on the motion trajectory, so that a user may select a corresponding point on the motion trajectory to start to play corresponding video content at an image frame corresponding to the point. This implements play of video content based on a spatial cue, and improves user experience.

BRIEF DESCRIPTION OF DRAWINGS

FIG. 1 is a schematic flowchart of a video play method according to an embodiment of this application;

FIG. 2 is a schematic diagram of displaying a motion trajectory on a play interface according to an embodiment of this application;

DESCRIPTION OF EMBODIMENTS

Figure 3:
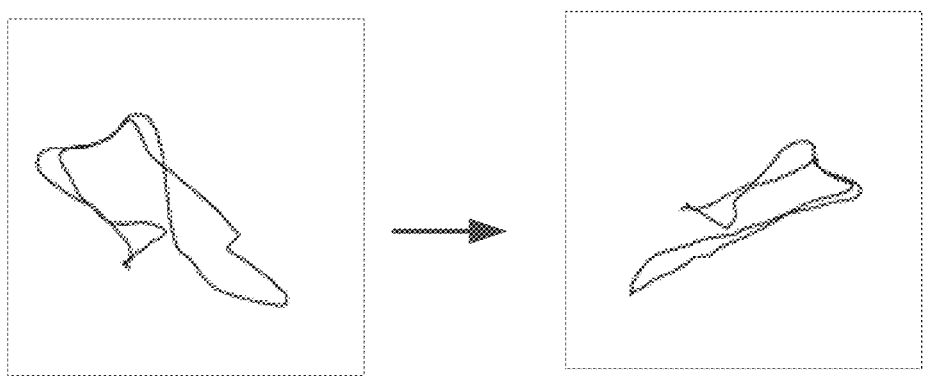
FIG. 3 is a schematic diagram of changing a display viewing angle of a motion trajectory according to an embodiment of this application.

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

Terms "first", "second", and the like in the specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and claims, "and/or" represents at least one of connected objects, and a character "/" generally represents an "or" relationship between associated objects.

With reference to the accompanying drawings, the following describes in detail a video play method and apparatus and an electronic device provided in the embodiments of this application by using specific embodiments and application scenarios thereof.

FIG. 1 is a schematic flowchart of a video play method according to an embodiment of this application. As shown in FIG. 1, in one aspect, an embodiment of this application provides a video play method. The method includes the following steps.

Step 101: A motion trajectory is displayed on a play interface of a target video when the target video is played, where the motion trajectory is a motion trajectory of an electronic device when photographing the target video, and points on the motion trajectory correspond to image frames in the target video.

In this embodiment of this application, the target video may be played by using video play software. The play interface of the target video may occupy an entire screen of the electronic device, or may only occupy a part of the screen of the electronic device. When the target video is played, the motion trajectory of the target video is further displayed on the play interface at the same time. The motion trajectory may be set at locations such as an upper left corner, an upper right corner, a lower left corner, or a lower right corner of the play interface, to minimize impact on a fact that users watch the target video. The motion trajectory may be displayed in a small window form. The motion trajectory is the motion trajectory of the electronic device. Specifically, the motion trajectory is the motion trajectory of the electronic device when photographing the target video. When the target video is photographed, the electronic device may be located by using a localization technology not lower than a centimeter level, for example, a SLAM technology (namely, simultaneous localization and mapping, SLAM). Therefore, there is a correspondence between the points on the motion trajectory and the image frames in the target video. The correspondence may be a one-to-one correspondence, that is, one point on the motion trajectory corresponds to one image frame in the target video. Alternatively, the correspondence may be one-to-many correspondence, that is, one point on the motion trajectory corresponds to a plurality of image frames in the target video.

In some embodiments of this application, the motion trajectory may be synchronously and directly displayed on the play interface of the target video when the target video is played, that is, without needing to be triggered by the user; or the corresponding motion trajectory may be displayed on the play interface of the target video only when an input of the user for triggering the display of the corresponding motion trajectory on the play interface of the target video is received.

Optionally, when the target video is played, a trajectory identifier may be displayed on the play interface of the target video. The trajectory identifier indicates the motion trajectory corresponding to the target video. If an input of the user for the trajectory identifier is received, for example, a tap input, a long press input, or a drag input, the electronic device displays the corresponding motion trajectory on the play interface of the target video in response to the input.

Step 102: A first input of a user for a target point on the motion trajectory is received.

Step 103: In response to the first input, the target video is controlled to start playing from an image frame corresponding to the target point.

In this embodiment of this application, the user may select one point on the motion trajectory, so that content displayed on the play interface jumps to an image frame corresponding to the point, and the target video starts to be played from a location of the image frame. Specifically, after the motion trajectory is displayed, if the first input of the user for the target point on the motion trajectory is received, for example, the first input is an input of tapping any point on the motion trajectory, the electronic device starts to play the target video on the play interface from the image frame corresponding to the target point in response to the first input, that is, starts to play the target video from the image frame at a spatial location of the target point. Therefore, the user may select video content that the user is interested in for watching based on a spatial cue (that is, motion trajectory information) of the target video. This improves watching experience of the user.

Therefore, in this embodiment of this application, the motion trajectory of photographing the target video is synchronously displayed when the target video is played, and there is a correspondence between video frames of the target video and the points on the motion trajectory, so that the user may select a corresponding point on the motion trajectory to start to play corresponding video content at an image frame corresponding to the point. This implements play of video content based on the spatial cue, and improves user experience.

FIG. 2 is a schematic diagram of displaying a motion trajectory on a play interface according to an embodiment of this application. As shown in FIG. 2, in this embodiment of this application, a target video is played on a play interface, and a time progress bar is displayed. A user may input for the time progress bar to change a picture currently played on the play interface. In addition, the motion trajectory corresponding to the target video is displayed at an upper right corner of the play interface in a small window form. The motion trajectory is a motion trajectory of a camera when photographing the target video. The user may select, by using the motion trajectory, video content that is desired to be played and that is related to a spatial cue.

In some embodiments of this application, optionally, before displaying the motion trajectory on the play interface of the target video when the target video is played, the method further includes:

receiving a second input of the user;

in response to the second input, recording the target video, and while recording the target video, recording motion trajectory information of an electronic device that records the target video; and associating and saving the target video and the motion trajectory information.

In other words, to display the motion trajectory corresponding to the target video when the target video is played, the motion trajectory information of the electronic device that photographs the target video may be recorded when the target video is photographed. Specifically, if the second input of the user is received, for example, the second input is an input of tapping a record button on a photographing interface of the electronic device, the electronic device records the target video in response to the second input, and records the motion trajectory information of the electronic device while recording the target video. When the target video is photographed, a localization technology not lower than a centimeter level, for example, a SLAM technology, may be used to locate the electronic device, and the photographed target video and the motion trajectory information are associated and saved, so that when the target video is played, the motion trajectory corresponding to the target video can be conveniently obtained and displayed.

In some embodiments of this application, optionally, when/before the target video is recorded, whether to record the motion trajectory information may be selected. If the user selects to record the motion trajectory information, the motion trajectory information is recorded while the target video is photographed subsequently. If the user selects not to record the motion trajectory information, the motion trajectory information is not recorded.

In some other embodiments of this application, optionally, the electronic device may parse the target video to obtain the motion trajectory of the target video. In other words, the target video is automatically parsed to obtain content of each image frame in the target video, then the motion trajectory of the target video is automatically constructed based on the content of each image frame, for example, picture content and caption content, and finally, the automatically generated motion trajectory is displayed.

In some embodiments of this application, optionally, when the motion trajectory is displayed, the motion trajectory may be divided into several segments based on spatial information, colors and line thicknesses of different segments are different, and a spatial feature corresponding to each segment of the motion trajectory is identified next to the segment of the motion trajectory. For example, the spatial feature may be division of indoor space such as a bedroom, a kitchen, and a living room, or may be division of outdoor space such as a station and a road. Therefore, the user may quickly locate corresponding video content in the target video with reference to identified spatial features.

In some embodiments of this application, optionally, after displaying the motion trajectory on the play interface of the target video, the method further includes:

receiving a third input of the user for the motion trajectory; and in response to the third input, changing a display size of the motion trajectory and/or changing a display viewing angle of the motion trajectory.

In this embodiment, the user may adjust a size or a viewing angle of the motion trajectory according to a requirement of the user. Specifically, if the third input of the user for the motion trajectory is received, for example, the third input is an input of tapping a location of the motion trajectory with two fingers at the same time and sliding in opposite directions, the electronic device enlarges the display size of the motion trajectory in response to the third input. Therefore, the motion trajectory that originally has a small size may be enlarged, to facilitate the user to select a point on the motion trajectory. For another example, if the third input is an input of tapping the location of the motion trajectory with two fingers at the same time and sliding in a same direction, the electronic device reduces the display size of the motion trajectory in response to the third input. Therefore, the display size of the motion trajectory may be reduced, and interference of the motion trajectory on the target video is reduced. For another example, if the third input is an input of long pressing the location of the motion trajectory with one finger and sliding, the electronic device adjusts the viewing angle or display viewing angle of the motion trajectory in response to the third input. The motion trajectory is constructed based on three dimensions and is displayed on a two-dimensional screen. Therefore, such interaction is provided, so that the user may select a trajectory point outside a default viewing angle. Certainly, a display location of the motion trajectory on the screen of the electronic device may further be changed by using the third input.

FIG. 3 is a schematic diagram of changing a display viewing angle of a motion trajectory according to an embodiment of this application. As shown in FIG. 3, the display viewing angle of the motion trajectory may be changed by using an input such as dragging the motion trajectory. For example, the motion trajectory rotates leftward by a specific angle, so that a user may conveniently select any trajectory point.

In some embodiments of this application, controlling a target video to start playing from an image frame corresponding to a target point includes:

when the target point is a location at which a first point and a second point of the motion trajectory overlap, displaying, through division, the play interface as two play sub-windows, where a first play sub-window starts to play the target video from a first image frame corresponding to the first point, and a second play sub-window starts to play the target video from a second image frame corresponding to the second point.

Specifically, if the target point is the location at which the first point and the second point of the motion trajectory overlap, that is, the motion trajectory crosses and overlaps at the target point location, which means that a camera has moved to the spatial location twice. The first point corresponds to the first image frame in the target video, and the second point corresponds to the second image frame in the target video. In this case, the electronic device may display, through division, the play interface as the two play sub-windows, or the two play sub-windows are simultaneously displayed on the play interface. The two play sub-windows are respectively the first play sub-window and the second play sub-window, where the first play sub-window starts to play the target video from the first image frame corresponding to the first point, and the second play sub-window starts to play the target video from the second image frame corresponding to the second point, for the user to select any play sub-window.

Optionally, if the user selects a specific play sub-window, the play sub-window is enlarged to an original size of the play interface, and a play sub-window that is not selected is closed and disappears. If the user does not select a play sub-window, the two play sub-windows continue playing until the target video ends.

Certainly, it can be learned that when the target point is a location at which a plurality of points of the motion trajectory overlap, play sub-windows of which a quantity corresponds to a quantity of overlapped points are displayed with reference to the foregoing display method, each play sub-window corresponds to an image frame corresponding to one point, and the target video starts to be played from the corresponding image frame.

Figure 4:
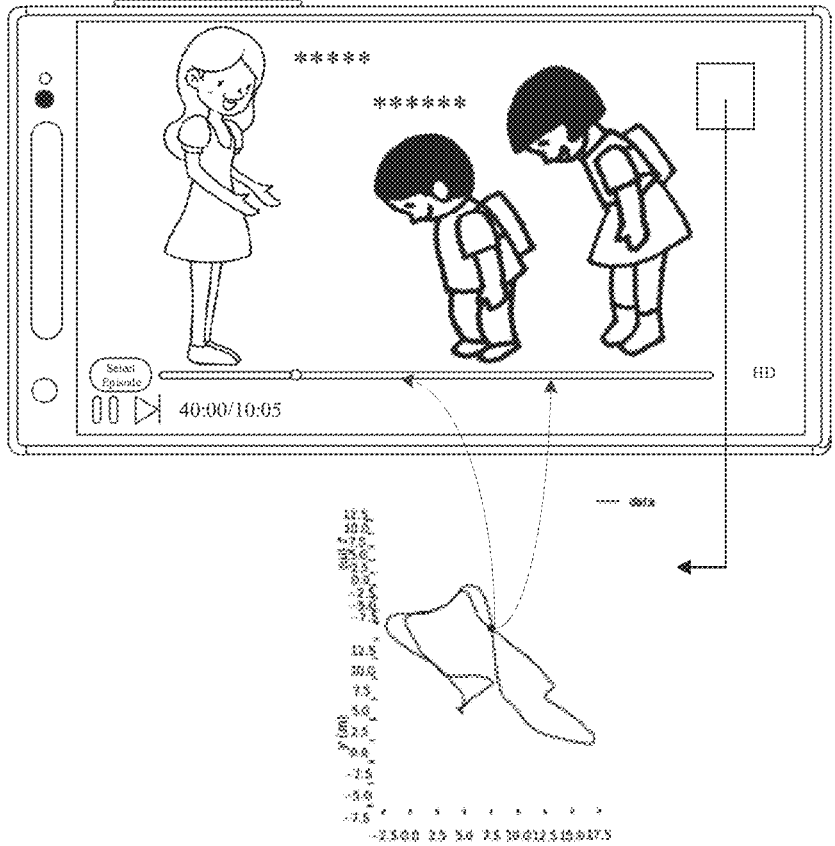
FIG. 4 is a view of two different image frames that are of a target point and that correspond to a target video.

FIG. 4 is a view of two different image frames that are of a target point and that correspond to a target video. As shown in FIG. 4, the target point is a point at which a motion trajectory crosses and overlaps, and represents that a camera has moved to the spatial location twice when photographing the target video, so that the target point corresponds to two different image frames in the target video. Locations of the two image frames on a time progress bar are different. The electronic device may display, through division, a play interface as two play sub-windows to correspond to the two different image frames. A user may select any play sub-window to watch.

In some other embodiments of this application, after receiving a first input of the user for the target point on the motion trajectory, the method further includes:

when the target point is a location at which a first point and a second point of the motion trajectory overlap, in response to the first input, displaying the time progress bar, a first identifier, and a second identifier on the play interface, where the first identifier and the second identifier are set on the time progress bar, the first identifier is configured to identify a location that is of a first target image frame corresponding to the first point and that is on the time progress bar, and the second identifier is configured to identify a location that is of a second target image frame corresponding to the second point and that is on the time progress bar;

receiving a fourth input of the user for the first identifier or the second identifier; and in response to the fourth input, controlling the target video to start playing from a location of the first identifier or the second identifier on the time progress bar.

In other words, if the first input of the user for the target point on the motion trajectory is received, for example, an input of tapping the target point, and the target point is the location at which the first point and the second point of the motion trajectory overlap, which means that the motion trajectory crosses and overlaps at the target point location, that is, the electronic device that photographs the target video has moved to the spatial location twice, the electronic device displays the time progress bar, the first identifier, and the second identifier on the play interface in response to the first input. The first identifier and the second identifier are set on the time progress bar, where the first identifier is configured to identify a location that is of a first image frame corresponding to the first point and that is on the time progress bar, and the second identifier is configured to identify a location that is of a second image frame corresponding to the second point and that is on the time progress bar, to remind the user that the target point corresponds to different image frames of the target video, and to remind the user of locations that are of the two different image frames and that are on the time progress bar. In this case, if the fourth input of the user for the first identifier or the second identifier is received, for example, the fourth input is an input of tapping the first identifier or the second identifier, the electronic device starts to play the target video on the play interface from a location of the first identifier or the second identifier on the time progress bar in response to the fourth input, that is, the user may select any one of the first identifier and the second identifier to jump to display a corresponding image frame. Optionally, after the user selects any one of the first identifier and the second identifier, the target video starts to be played from the location corresponding to the selected first identifier or second identifier on the time progress bar by default until play of the target video ends. During a play process, the first identifier and the second identifier are always displayed on the time progress bar, for the user to switch to the other identifier at any time for play.

Certainly, it can be learned that when the target point is a location at which a plurality of points of the motion trajectory overlap, identifiers of which a quantity corresponds to a quantity of overlapped points are displayed on the time progress bar with reference to the foregoing display method, to identify a location that is of an image frame corresponding to each point and that is on the time progress bar.

Figure 5:
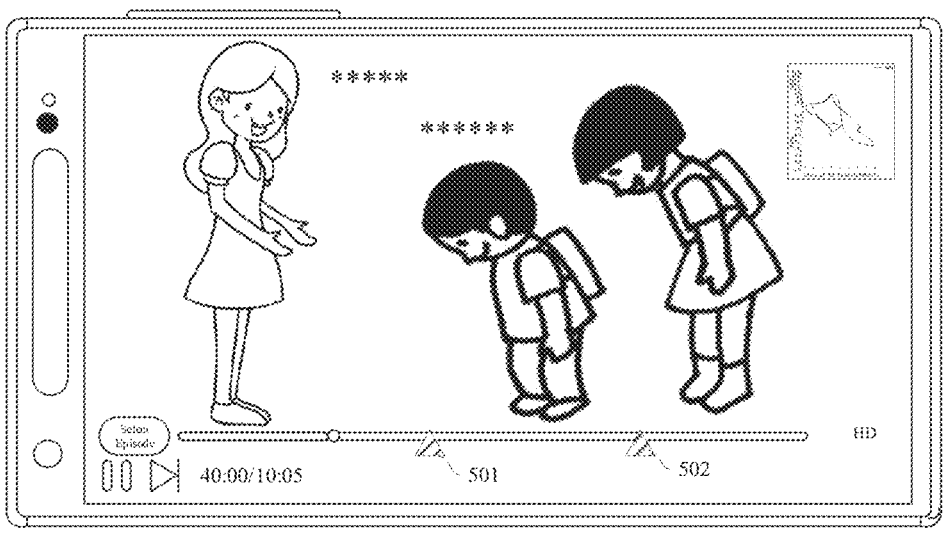
FIG. 5 is a schematic diagram of a first identifier and a second identifier according to an embodiment of this application.

FIG. 5 is a schematic diagram of a first identifier and a second identifier according to an embodiment of this application. As shown in FIG. 5, if a user selects one trajectory overlap point on a motion trajectory, a time progress bar is displayed on a play interface, and a first identifier 501 and a second identifier 502 are displayed on the time progress bar, to identify locations that are of different image frames corresponding to the trajectory overlap point and that are on the time progress bar. The user may select a location of any identifier to trigger the play interface to switch to the image frame corresponding to the identifier and start to play.

In conclusion, in this embodiment of this application, a motion trajectory of photographing a target video is synchronously displayed when the target video is played, and there is a correspondence between video frames of the target video and points on the motion trajectory, so that the user may select a corresponding point on the motion trajectory to start to play corresponding video content at an image frame corresponding to the point. This implements play of video content based on a spatial cue, and improves user experience.

It should be noted that a video play method provided in the embodiments of this application may be performed by a video play apparatus, or a control module in the video play apparatus for performing the video play method. In the embodiments of this application, an example in which the video play apparatus performs the video play method is used to describe the video play apparatus provided in the embodiments of this application.

Figure 6:
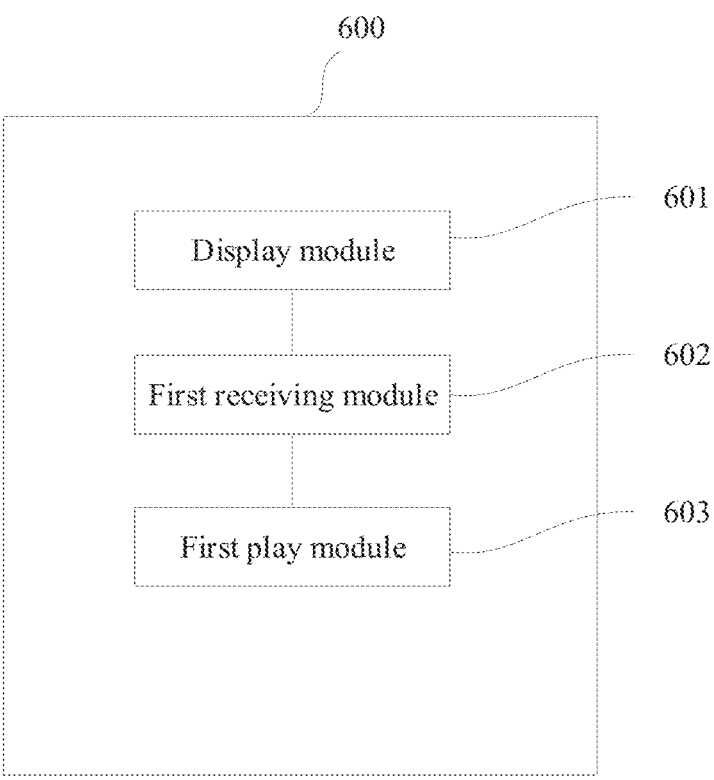
FIG. 6 is a schematic diagram of a structure of a video play apparatus according to an embodiment of this application.

FIG. 6 is a schematic diagram of a structure of a video play apparatus according to an embodiment of this application. As shown in FIG. 6, in another aspect, an embodiment of this application further provides a video play apparatus, and the apparatus 600 includes:

a display module 601, configured to display a motion trajectory on a play interface of a target video when the target video is played, where the motion trajectory is a motion trajectory of an electronic device when photographing the target video, and points on the motion trajectory correspond to image frames in the target video;

a first receiving module 602, configured to receive a first input of a user for a target point on the motion trajectory; and a first play module 603, configured to: in response to the first input, control the target video to start playing from an image frame corresponding to the target point.

Optionally, the apparatus further includes:

a second receiving module, configured to receive a second input of the user;

a recording module, configured to: in response to the second input, record the target video, and while recording the target video, record motion trajectory information of the electronic device that records the target video; and a saving module, configured to associate and save the target video and the motion trajectory information.

Optionally, the apparatus further includes:

a third receiving module, configured to receive a third input of the user for the motion trajectory; and a changing module, configured to: in response to the third input, change a display size of the motion trajectory and/or change a display viewing angle of the motion trajectory.

Optionally, the first play module includes:

a play unit, configured to: when the target point is a location at which a first point and a second point of the motion trajectory overlap, display, through division, the play interface as two play sub-windows, where a first play sub-window starts to play the target video from a first image frame corresponding to the first point, and a second play sub-window starts to play the target video from a second image frame corresponding to the second point.

Optionally, the apparatus further includes:

an identification module, configured to: when the target point is the location at which the first point and the second point of the motion trajectory overlap, in response to the first input, display a time progress bar, a first identifier, and a second identifier on the play interface, where the first identifier and the second identifier are set on the time progress bar, the first identifier is configured to identify a location that is of the first image frame corresponding to the first point and that is on the time progress bar, and the second identifier is configured to identify a location that is of the second image frame corresponding to the second point and that is on the time progress bar;

a fourth receiving module, configured to receive a fourth input of the user for the first identifier or the second identifier; and a second play module, configured to: in response to the fourth input, control the target video to start playing from a location the first identifier or the second identifier on the time progress bar.

In this embodiment of this application, the motion trajectory of photographing the target video is synchronously displayed when the target video is played, and there is a correspondence between video frames of the target video and points on the motion trajectory, so that the user may select a corresponding point on the motion trajectory to start to play corresponding video content at an image frame corresponding to the point. This implements play of video content based on a spatial cue, and improves user experience.

The video play apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, a vehicle-mounted electronic device, a wearable device, an ultra-mobile personal computer (ultra-mobile personal computer, UMPC), a netbook, a personal digital assistant (personal digital assistant, PDA), or the like. The non-mobile electronic device may be a personal computer (personal computer, PC), a television (television, TV), a teller machine, a self-service machine, or the like. This is not specifically limited in this embodiment of this application.

The video play apparatus in this embodiment of this application may be an apparatus with an operating system. The operating system may be an Android (Android) operating system, an iOS operating system, or another possible operating system. This is not specifically limited in this embodiment of this application.

The video play apparatus provided in this embodiment of this application can implement processes implemented in the method embodiments from FIG. 1 to FIG. 5. To avoid repetition, details are not described herein again.

Figure 7:
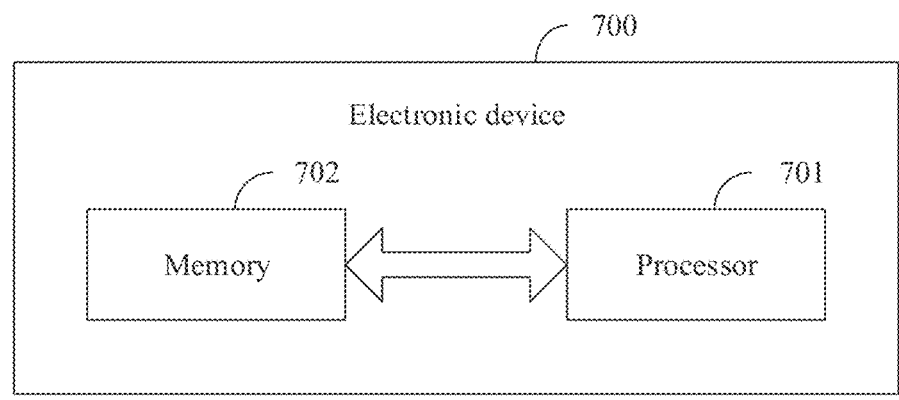
FIG. 7 is a schematic diagram of a structure of an electronic device according to an embodiment of this application.

Optionally, as shown in FIG. 7, an embodiment of this application further provides an electronic device 700, including a processor 701, a memory 702, and a program or an instruction that is stored in the memory 702 and that can be run on the processor 701. When the program or the instruction is executed by the processor 701, the processes of the foregoing video play method embodiments are implemented and same technical effect can be achieved. To avoid repetition, details are not described herein again.

It should be noted that the electronic device in this embodiment of this application includes the foregoing mobile electronic device and non-mobile electronic device.

Figure 8:
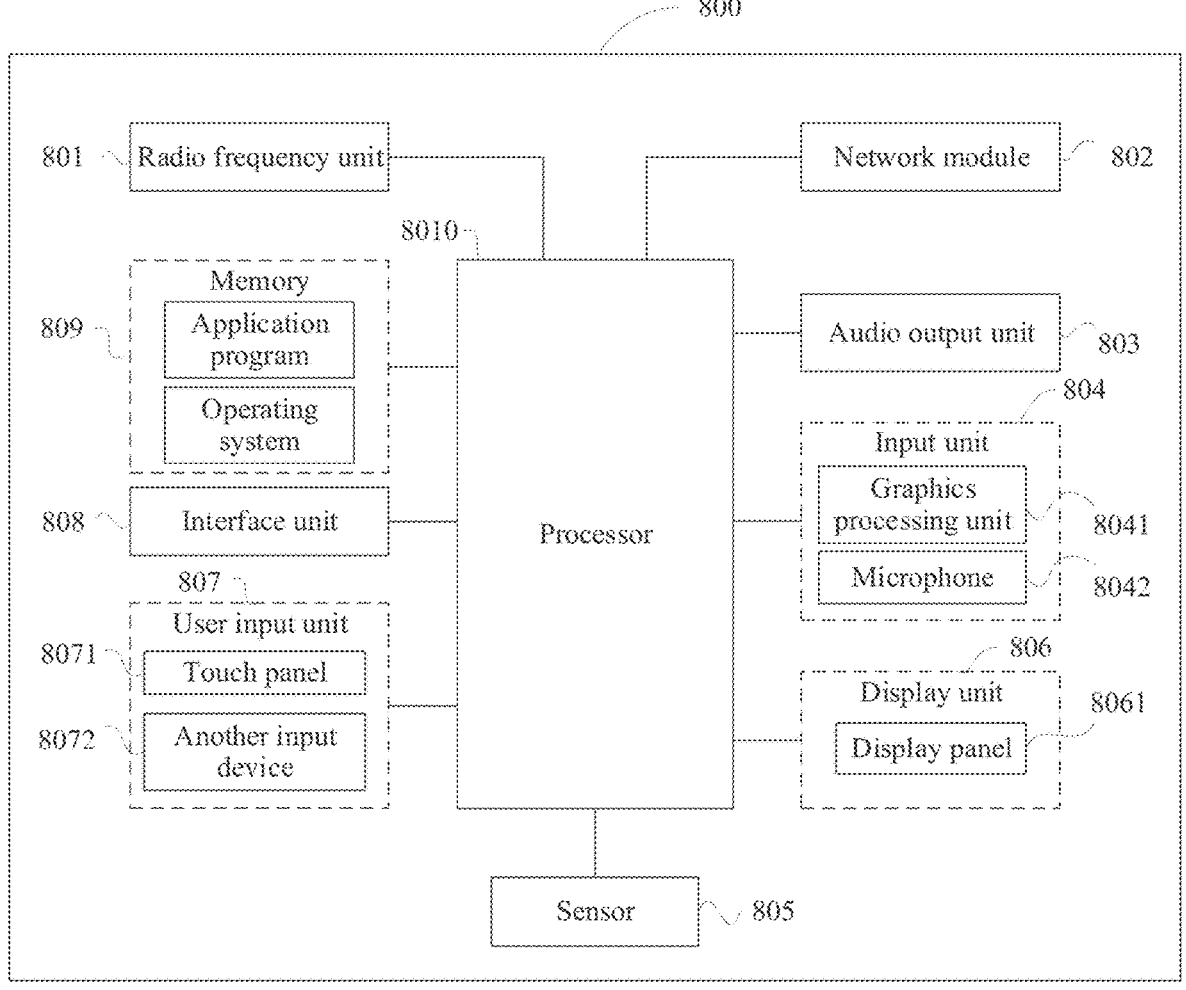
FIG. 8 is a schematic diagram of a hardware structure of an electronic device according to an embodiment of this application.

FIG. 8 is a schematic diagram of a hardware structure of an electronic device according to an embodiment of this application.

An electronic device 800 includes but is not limited to components such as a radio frequency unit 801, a network module 802, an audio output unit 803, an input unit 804, a sensor 805, a display unit 806, a user input unit 807, an interface unit 808, a memory 809, and a processor 8010.

A person skilled in the art can understand that the electronic device 800 may further include a power supply (such as a battery) that supplies power to each component. The power supply may be logically connected to the processor 8010 by using a power supply management system, to implement functions such as charging and discharging management, and power consumption management by using the power supply management system. The structure of the electronic device shown in FIG. 8 does not constitute a limitation on the electronic device. The electronic device may include components more or fewer than those shown in the diagram, combine some components, or have different component arrangements. Details are not described herein again.

The display module 806 is configured to display a motion trajectory on a play interface of a target video when the target video is played, where the motion trajectory is a motion trajectory of the electronic device 800 when photographing the target video, and points on the motion trajectory correspond to image frames in the target video.

The user input unit 807 is configured to receive a first input of a user for a target point on the motion trajectory.

The display unit 806 is further configured to: in response to the first input, control the target video to start playing from an image frame corresponding to the target point.

Optionally, the user input unit 807 is further configured to receive a second input of the user.

The input unit 804 is configured to: in response to the second input, record the target video, and while recording the target video, record motion trajectory information of the electronic device 800 that records the target video.

The memory 809 is configured to associate and save the target video and the motion trajectory information.

Optionally, the user input unit 807 is further configured to receive a third input of the user for the motion trajectory.

The display unit 806 is further configured to: in response to the third input, change a display size of the motion trajectory and/or change a display viewing angle of the motion trajectory.

Optionally, the display unit 806 is further configured to: when the target point is a location at which a first point and a second point of the motion trajectory overlap, display, through division, the play interface as two play sub-windows, where a first play sub-window starts to play the target video from a first image frame corresponding to the first point, and a second play sub-window starts to play the target video from a second image frame corresponding to the second point.

Optionally, the display unit 806 is further configured to: when the target point is the location at which the first point and the second point of the motion trajectory overlap, in response to the first input, display a time progress bar, a first identifier, and a second identifier on the play interface, where the first identifier and the second identifier are set on the time progress bar, the first identifier is configured to identify a location that is of the first image frame corresponding to the first point and that is on the time progress bar, and the second identifier is configured to identify a location that is of the second image frame corresponding to the second point and that is on the time progress bar.

The user input unit 807 is further configured to receive a fourth input of the user for the first identifier or the second identifier.

The display unit 806 is further configured to: in response to the fourth input, control the target video to start playing from a location of the first identifier or the second identifier on the time progress bar.

In this embodiment of this application, the motion trajectory of photographing the target video is synchronously displayed when the target video is played, and there is a correspondence between video frames of the target video and the points on the motion trajectory, so that the user may select a corresponding point on the motion trajectory to start to play corresponding video content at an image frame corresponding to the point. This implements play of video content based on a spatial cue, and improves user experience.

It should be understood that in this embodiment of this application, the input unit 804 may include a graphics processing unit (Graphics Processing Unit, GPU) 8041 and a microphone 8042. The graphics processing unit 8041 processes image data of a static picture or a video obtained by an image capture apparatus (for example, a camera) in a video capture mode or an image capture mode. The display unit 806 may include a display panel 8061. The display panel 8061 may be configured in a form such as a liquid crystal display or an organic light-emitting diode. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include but is not limited to a physical keyboard, a functional button (such as a volume control button or a power on/off button), a trackball, a mouse, and a joystick. Details are not described herein again. The memory 809 may be configured to store a software program and various data, including but not limited to an application program and an operating system. An application processor and a modem processor may be integrated into the processor 8010, the application processor mainly processes an operating system, a user interface, an application program, and the like, and the modem processor mainly processes wireless communication. It may be understood that, the modem processor may alternatively not be integrated into the processor 8010.

An embodiment of this application further provides a readable storage medium. The readable storage medium stores a program or an instruction. When the program or the instruction is executed by a processor, processes of the foregoing video play method embodiments are implemented, and same technical effect can be achieved. To avoid repetition, details are not described herein again.

The processor is a processor in the electronic device in the foregoing embodiment. The readable storage medium includes a computer-readable storage medium such as a computer read-only memory (Read-Only Memory, ROM), a random access memory (Random Access Memory, RAM), a magnetic disk, or an optical disc.

An embodiment of this application further provides a computer program product. The computer program product is stored in a non-transient storage medium. The computer program product is executed by at least one processor to implement processes of the foregoing video play method embodiments, and same technical effect can be achieved. To avoid repetition, details are not described herein again.

An embodiment of this application further provides a chip. The chip includes a processor and a communication interface. The communication interface is coupled to the processor. The processor is configured to run a program or an instruction to implement processes of the foregoing video play method embodiments, and same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to this process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the implementations of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, a network device, or the like) to perform the methods described in the embodiments of this application.

The embodiments of this application are described above with reference to the accompanying drawings. However, this application is not limited to the foregoing specific implementations. The foregoing specific implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. A video play method, comprising:

displaying a motion trajectory on a play interface of a target video when the target video is played, wherein the motion trajectory is a motion trajectory of an electronic device when the electronic device photographing the target video, and points on the motion trajectory correspond to image frames in the target video;

receiving a first input of a user for a target point on the motion trajectory; and in response to the first input, controlling the target video to start playing from an image frame corresponding to the target point;

wherein the controlling the target video to start playing from an image frame corresponding to the target point comprises:

when the target point is a location at which a first point and a second point of the motion trajectory overlap, displaying, through division, the play interface as two play sub-windows, wherein a first play sub-window starts to play the target video from a first image frame corresponding to the first point, and a second play sub-window starts to play the target video from a second image frame corresponding to the second point.

2. The method according to claim 1, wherein before the displaying a motion trajectory on a play interface of a target video when the target video is played, the method further comprises:

receiving a second input of the user;

in response to the second input, recording the target video, and while recording the target video, recording motion trajectory information of the electronic device that records the target video; and associating and saving the target video and the motion trajectory information.

3. The method according to claim 1, wherein after the displaying a motion trajectory on a play interface of a target video, the method further comprises:

receiving a third input of the user for the motion trajectory; and in response to the third input, changing a display size of the motion trajectory and/or changing a display viewing angle of the motion trajectory.

4. The method according to claim 1, wherein after the receiving a first input of a user for a target point on the motion trajectory, the method further comprises:

when the target point is a location at which a first point and a second point of the motion trajectory overlap, in response to the first input, displaying a time progress bar, a first identifier, and a second identifier on the play interface, wherein the first identifier and the second identifier are set on the time progress bar, the first identifier is configured to identify a location that is of a first image frame corresponding to the first point and that is on the time progress bar, and the second identifier is configured to identify a location that is of a second image frame corresponding to the second point and that is on the time progress bar;

receiving a fourth input of the user for the first identifier or the second identifier; and in response to the fourth input, controlling the target video to start playing from a location of the first identifier or the second identifier on the time progress bar.

5. A non-transitory readable storage medium, wherein the non-transitory readable storage medium stores a program or an instruction, and when the program or the instruction is executed by a processor, steps of the video play method according to claim 1 are implemented.

6. A computer program product, wherein the computer program product is stored in a non-transitory readable storage medium, and the computer program product is executed by at least one processor to implement steps of the video play method according to claim 1.

7. An electronic device, comprising a processor, a memory, and a program or an instruction stored in the memory and executable on the processor, wherein the program or the instructions, when executed by the processor, causes the processor to implement:

displaying a motion trajectory on a play interface of a target video when the target video is played, wherein the motion trajectory is a motion trajectory of the electronic device when the electronic device photographing the target video, and points on the motion trajectory correspond to image frames in the target video;

receiving a first input of a user for a target point on the motion trajectory; and in response to the first input, controlling the target video to start playing from an image frame corresponding to the target point;

wherein the controlling the target video to start playing from an image frame corresponding to the target point comprises:

when the target point is a location at which a first point and a second point of the motion trajectory overlap, displaying, through division, the play interface as two play sub-windows, wherein a first play sub-window starts to play the target video from a first image frame corresponding to the first point, and a second play sub-window starts to play the target video from a second image frame corresponding to the second point.

8. The electronic device according to claim 7, wherein the program or the instructions, when executed by the processor, further causes the processor to implement:

receiving a second input of the user;

in response to the second input, recording the target video, and while recording the target video, recording motion trajectory information of the electronic device that records the target video; and associating and saving the target video and the motion trajectory information.

9. The electronic device according to claim 7, wherein the program or the instructions, when executed by the processor, further causes the processor to implement:

receiving a third input of the user for the motion trajectory; and in response to the third input, changing a display size of the motion trajectory and/or changing a display viewing angle of the motion trajectory.

10. The electronic device according to claim 7, wherein the program or the instructions, when executed by the processor, further causes the processor to implement:

when the target point is a location at which a first point and a second point of the motion trajectory overlap, in response to the first input, displaying a time progress bar, a first identifier, and a second identifier on the play interface, wherein the first identifier and the second identifier are set on the time progress bar, the first identifier is configured to identify a location that is of a first image frame corresponding to the first point and that is on the time progress bar, and the second identifier is configured to identify a location that is of a second image frame corresponding to the second point and that is on the time progress bar;

receiving a fourth input of the user for the first identifier or the second identifier; and in response to the fourth input, controlling the target video to start playing from a location of the first identifier or the second identifier on the time progress bar.

11. A chip, comprising a processor and a communication interface, wherein the communication interface is coupled to the processor, and the processor is configured to run a program or an instruction to implement:

displaying a motion trajectory on a play interface of a target video when the target video is played, wherein the motion trajectory is a motion trajectory of an electronic device when the electronic device photographing the target video, and points on the motion trajectory correspond to image frames in the target video;

receiving a first input of a user for a target point on the motion trajectory; and in response to the first input, controlling the target video to start playing from an image frame corresponding to the target point;

wherein the controlling the target video to start playing from an image frame corresponding to the target point comprises:

when the target point is a location at which a first point and a second point of the motion trajectory overlap, displaying, through division, the play interface as two play sub-windows, wherein a first play sub-window starts to play the target video from a first image frame corresponding to the first point, and a second play sub-window starts to play the target video from a second image frame corresponding to the second point.

* * * * *